Patented Feb. 13, 1940

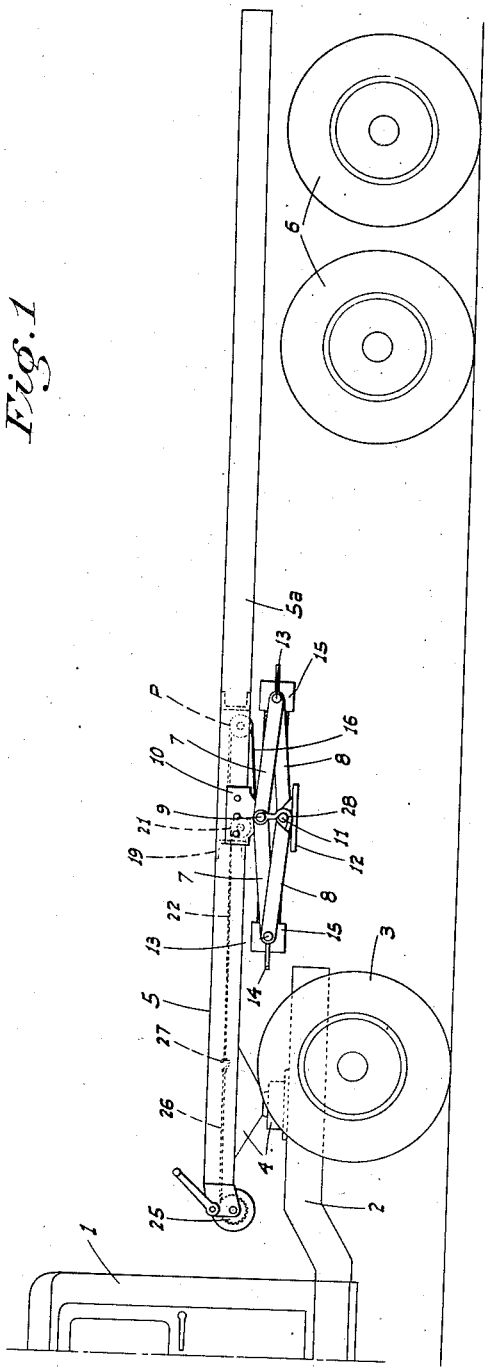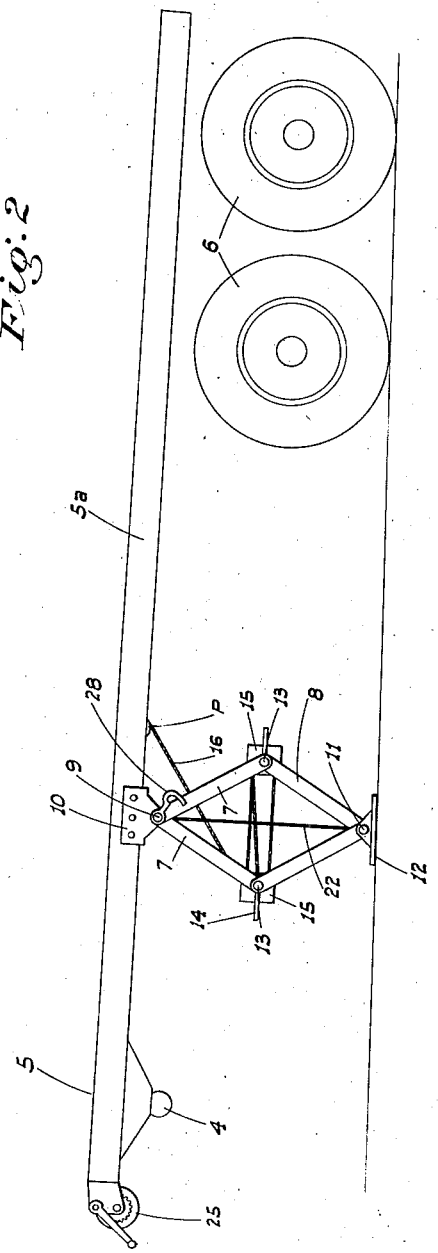

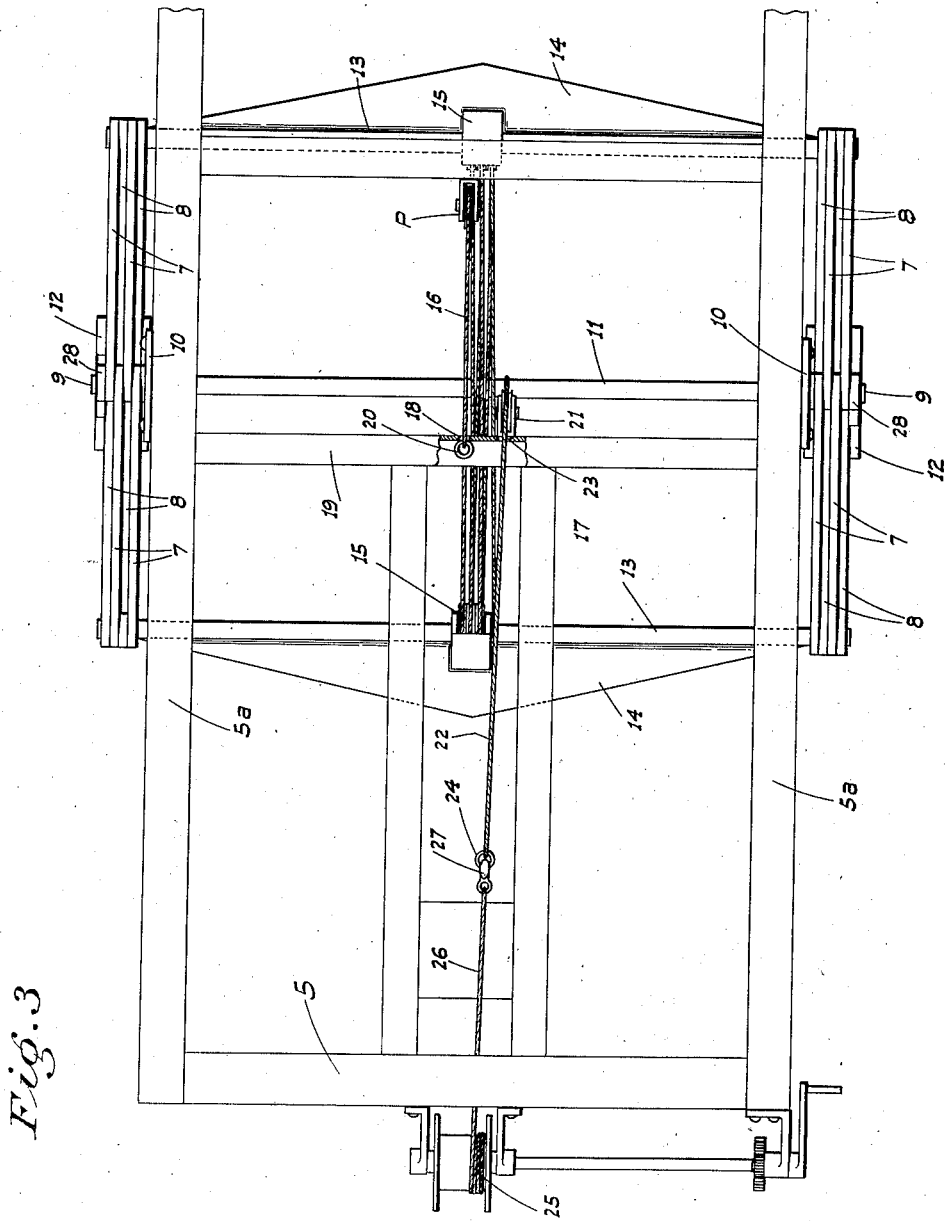

2,190,252

UNITED STATES PATENT OFFICE 2,190,252

JACK FOR SEMITRAILERS

William S. Brant, George J. Lucas, and Albert S. Weaver, Jr., Sacramento, and Smith W. Eakle, Woodland, Calif., assignors to Weaver Tractor Co., Sacramento, Calif., a corporation of California Application May 12, 1939, Serial No. 273,272

4 Claims. (Cl. 254—86)

This invention relates generally to an improvement in motor vehicle equipment, and in particular the invention is directed to an improved jack for semitrailers.

In the usual type semitrailer and truck assembly, it is desirable that the trailer be detachably connected with the truck whereby when the trailer is being loaded or unloaded, the truck may be detached and used for other purposes or with another semitrailer. It is also the practice to detach the semitrailer from the truck and lower the front end of the trailer to the ground, so that tractors, wheeled implements and the like may be loaded directly from ground to trailer bed. The above manipulations of the semi-trailer can be done successfully and expeditiously only with the aid of a jack. We are aware that certain types of trailer-mounted jacks have been in use, but for many reasons—such as excessive cost, complicated structure, and undue weight—these jacks have not been adopted to any great extent by truck operators.

It is therefore the principal object of this invention to provide a jack of novel construction adapted to be mounted on and suspend from the bed or frame of a semi-trailer; the jack being relatively simple in construction, inexpensive to manufacture, light weight, and yet exceedingly effective for the purpose for which it is designed.

In the drawings similar characters of reference indicate corresponding parts in the several views:

Figure 1 is an end elevation of the device as mounted on a semi-trailer and in inoperative or folded position; the truck and trailer being shown diagrammatically.

Figure 2 is a similar view but with the device in operative position.

Figure 3 is a top plan view of the device in inoperative position.

Referring now more particularly to the characters of reference on the drawings, the numeral 1 indicates a truck including a frame 2, rear supporting and drive wheels 3. A swivel connection or fifth wheel assembly 4, including disconnectable elements, is mounted between the truck frame 2 and forward end of semitrailer frame 5; such assembly supporting the semitrailer frame at said end, while the other or rear end is supported by wheels 6. The above is common construction in semitrailer and truck units.

The jack which embodies the present invention comprises a pair of pantograph or lazy tong linkage assemblies, each disposed in a vertical plane below one of the side beams 5a of frame 5, and having upper links 7 and lower links 8, preferably in pairs. These assemblies are disposed adjacent the forward end of the frame 5 but rearwardly of the plane of the truck wheels 3. The common pivot 9 of the upper links 7 of each assembly is carried by a mounting bracket 10 fixed on and extending below the corresponding side beam 5a. The common pivot of the lower links 7 is a heavy duty rod or shaft 11 which extends horizontally from one assembly to the other; there being pivoted ground engaging shoes 12 carried by rod 11 and depending from the lower end of each assembly.

Adjacent ends of corresponding upper and lower links 7 and 8 are pivoted together by cross rods 13 which extend between the assemblies; and which in the claims are defined as the opposed pivots. These rods have longitudinally extending radial, and horizontally projecting fins or ribs 14 thereon in order to strengthen said rods against deflection. A multiple sheave block 15 is mounted in fixed connection with each cross rod centrally of its ends and with the sheave axis parallel to that of the corresponding rod 13. A cable 16 extends about and between the sheaves 15, one end of the cable being dead ended on one cross rod, while the other end of the cable passes rearwardly and upwardly from the forward sheave block and then forwardly over a fixed pulley P on the trailer frame. The cable then passes through an opening 18 in a cross beam 19 of the trailer frame, as shown in Fig. 1. A ring 20 on said other end of the cable prevents escape of such end from the opening in cross beam 19.

A single sheave block 21 is fixed on cross beam 19 and another cable 22 extends from a connection at one end with rod 11 over sheave 21, and forwardly through another hole 23 in the cross beam, and is provided with a ring 24 on the other end.

The jack may be operated from the usual power take-off of the truck (not shown), or from a hand winch, indicated generally at 25, mounted either on the semitrailer frame or on the truck; the winch including a cable 26 and a snap hook 27 on its free end.

When the device is not in use, the pantograph assemblies are folded to the position shown in Fig. 1 and in such position the entire mechanism is out of the way and in no manner interferes with normal use and travel of the semitrailer. This folding of the device is accomplished by engaging hook 27 with ring 24 by means of winch actuated cable 26. The assemblies are held in inoperative or folded position by hooks 28 on pivots 9 and engaging rod 11 at its ends.

To lower the device into a ground engaging and operative position, the hook 27 is released from ring 24 and connected with ring 20 and the winch operated in a direction to pull on cable 16 resulting in sheave blocks 15 being drawn toward each other and extension of the pantograph assemblies. With such extension, as shown in Fig. 2, the shoes 12 engage the ground and with continued extending movement, the semitrailer frame is raised at the forward end until the elements of swivel connection 4 are separated. Thereafter, the truck may move away from the semitrailer. If ground-to-trailer bed loading is to be carried out, the pantograph assemblies are permitted to fold until the forward end of the trailer frame 5 rests on the ground. After loading, the frame 5 is again lifted to a raised position to permit reconnection with the truck.

Also, if desired, the semitrailer when detached from the truck may be maintained in a level position by the jacks, and either loaded or unloaded in this position while the truck is being used elsewhere.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In the combination of a frame disposed above and movable along the ground, and a jack including a normally folded pantograph linkage, and means mounting said linkage at one end on and depending from the frame; of a swing hook secured on the uppermost linkage pivot to one side of the linkage, the opposed or lowermost pivot projecting from the same side of the linkage and being normally but releasably engaged by said hook.

2. In combination, a vehicle frame including spaced frame members, a pair of pantograph linkage assemblies disposed in facing relation beneath the frame, said assemblies being spaced apart in the same direction and at least as far as the frame members, plates mounted on and extending below the bottom of the frame members, the assemblies being pivoted at their upper ends on said plates a distance below said bottom of the frame members, and tie rods extending between the assemblies and at their ends forming the opposed and intermediate pivots of said assemblies.

3. In the combination of a vehicle frame, and a jack including a pantograph linkage assembly mounted on and depending from the frame, and separate means to extend and to fold said assembly; said separate means each comprising a flexible cable associated with said assembly, a member on the frame having a pair of openings therethrough in adjacent relation, the free end portions of the cables extending through said openings, connection elements of a size greater than said openings secured on the free ends of said cables, a pull cable adapted to be power actuated, and means on one end of said pull cable adapted for selective connection with either of said elements on said first named cables.

4. A jack for a frame disposed above and movable along the ground, the frame having spaced side beams, said jack comprising a pair of normally folded pantograph linkage assemblies, means mounting each assembly at its upper end on and depending from one of said side beams, the assembly being disposed in facing relation, a ground engaging element mounted on the lower end of each assembly, relatively long tie rods extending between the assemblies and at their ends forming the opposed pivots of said assemblies, a block and tackle extending substantially horizontally between and connected with said tie rods intermediate their ends, and radially projecting fins secured on and extending substantially the full length of said rods, said fins projecting from the rods in a direction opposite to the block and tackle, whereby to strengthen the rods against deflection.

WILLIAM S. BRANT.
GEO. J. LUCAS.
ALBERT S. WEAVER, Jr.
SMITH W. EAKLE.